Figure 1:
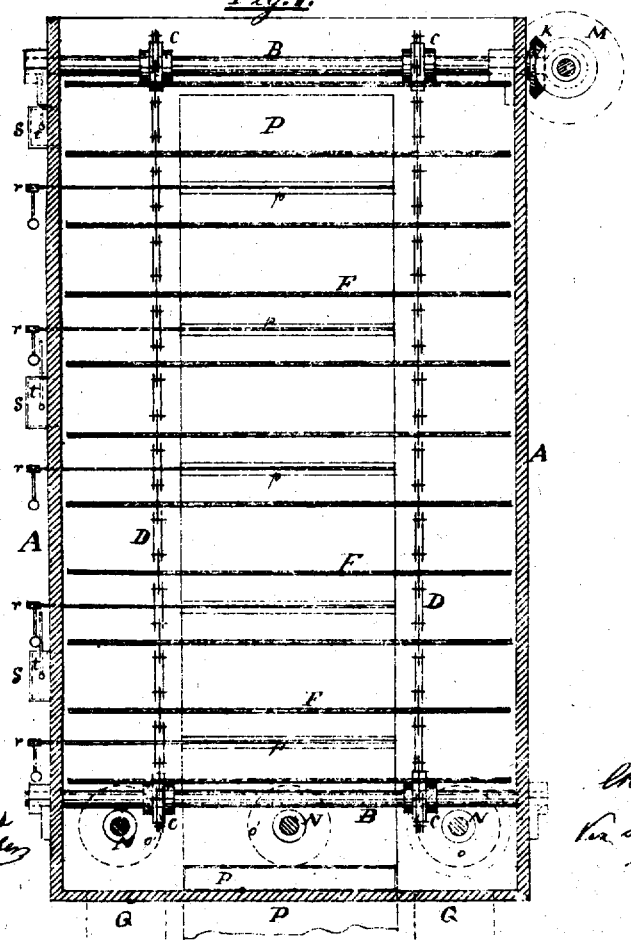

2 Sheets--Sheet 1.

C. ALDEN.

Improvement in Apparatus for Drying and Evaporating.

No. 4,010. Reissued June 7, 1870.

Witnesses:
C. Wahlers
E. F. Rastenhuber

Charles Alden
per
Geo. Sewell & Kapp
Attys

2 Sheets--Sheet 2.
C. ALDEN.
Improvement in Apparatus for Drying and Evaporating.
No. 4,010. Reissued June 7, 1870.
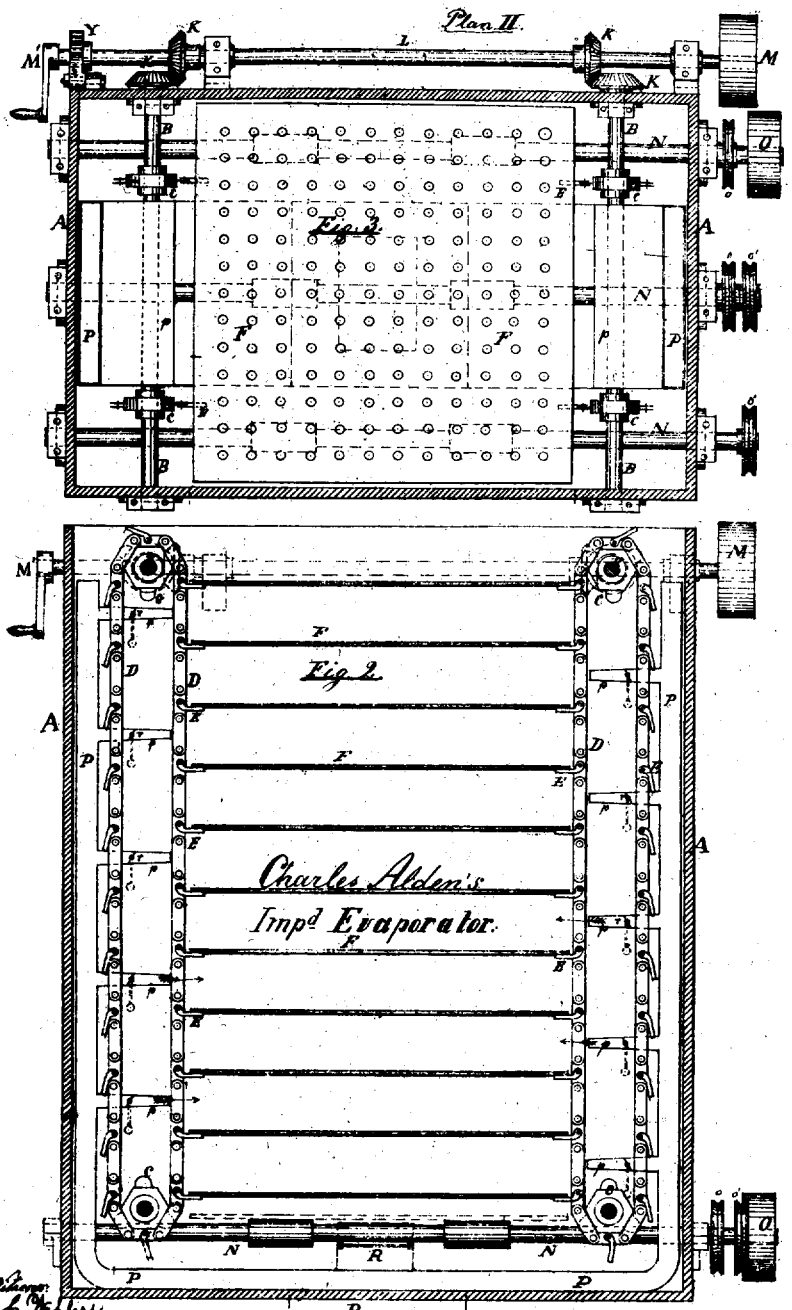
Witnesses:
C. Walters
E. F. Neuberschly
Charles Alden
Per
Tom Fairfax, Atty

UNITED STATES PATENT OFFICE.

CHARLES ALDEN, OF NEWBURG, FOR HIMSELF AND ALDEN FRUIT-PRESERVING COMPANY, OF NEW YORK, N. Y., ASSIGNEES OF CHARLES ALDEN.

IMPROVEMENT IN APPARATUS FOR EVAPORATING THE MOISTURE FROM ANIMAL AND VEGETABLE SUBSTANCES.

Specification forming part of Letters Patent No. 100,835, dated March 15, 1870; reissue No. 4,010, dated June 7, 1870.

DIVISION A.

*To all whom it may concern:*

Be it known that CHARLES ALDEN, of Newburg, in the county of Orange and State of New York, has invented a new and Improved Apparatus for Evaporating the Moisture from Animal and Vegetable Substances; and the following is hereby declared to be a full, clear, and exact description thereof, which will enable those skilled in the art to make and use the same, reference being had to the accompanying drawings forming part of this specification, in which drawings—

Figure 1 represents a transverse vertical section of this invention. Fig. 2 is a longitudinal vertical section of the same. Fig. 3 is a horizontal section of the same.

Similar letters indicate corresponding parts.

This invention consists in the arrangement of a series of platforms, one above the other, in a trunk or chamber supplied with a current or currents of hot or cold air, in such a manner that if said platforms are loaded with any material containing moisture, such moisture is rapidly evaporated, with little trouble or expense. On one or more sides of the trunk are air-chambers, provided with nozzles, to throw currents of air over or between the platforms. Said platforms rest upon supports, so arranged that each platform, after having been carried to the desired distance, is deposited upon a conveyer, and thereby removed from the trunk.

In the drawings, the letter F represents a series of platforms, which are placed, one above the other, in the interior of a trunk or chamber, A, and which may be made to rest on supports E, secured to endless chains D D, which run over chain-wheels C C, mounted on shafts B B, having their bearings on the side walls of the trunk or chamber. Said platforms are perforated with small holes, to allow a free circulation of the air, and, if the chain-wheels are caused to revolve, a rising or falling motion is imparted to the platforms. The motion of the chain-wheels is derived from the driving-shaft L, which is driven either by a hand-crank, M′, or by a pulley, M, said shaft being connected with the chain-shafts B B by means of gear-wheels K, and a stop-pawl, Z, which engages with a ratchet-wheel, Y, mounted on the driving-shaft L, serves to arrest the chains at any desired point. The chain-wheels C C at the bottom of the trunk are driven simply by the chains, and if the trunk is high, the chains are steadied by intermediate guide-rollers. Each of the platforms, on reaching the bottom of the trunk, is deposited upon the conveyer N, which receives motion by a pulley, O, and small belt-wheels *o o′*, and by this conveyer the successive platforms are carried out of the trunk, so that they can be readily removed, and again introduced at the top of the trunk. On the sides of the trunk are arranged two air-chambers, P P, which are supplied with hot or cold air from below, and which are provided with nozzles *p* for the discharge of the air.

By these means currents of hot or cold air are thrown over or between the platforms, and these currents are regulated by dampers *r*.

If hot air is used, suitable thermometers *t* may be applied in boxes S, attached to the sides of the trunk, to indicate the temperature of the air therein.

Suitable flues Q Q may be applied to introduce currents of cold air into the trunk to regulate the temperature, if desired.

The articles or materials from which the moisture is to be evaporated are placed upon the platforms, which are arranged in the trunk or chamber, one above the other, where said articles are exposed to the currents of air injected through the nozzles *p p*, and, as said currents pass over, through, and around the articles or substances spread upon the platforms, the moisture contained in said articles is rapidly carried off. This effect is materially facilitated by injecting in the trunk currents of heated rarefied air, and by imparting to the platforms a slow downward motion in the trunk, as above stated.

What is claimed as new, and desired to be secured by Letters Patent, is—

1. The arrangement of a series of platforms.

one above the other, in a trunk or chamber supplied with an artificial current or currents of heated rarefied air passing over, through, and around the substances placed on the platforms, substantially as described.

2. The arrangement of a series of platforms, receiving a rising and falling motion in a trunk or chamber supplied with a current or currents of hot or cold air, substantially in the manner shown and described.

3. The arrangement of an air-chamber on one or more sides of the trunk, said air-chambers being provided with nozzles, to throw currents of air over or between the platforms, substantially as set forth.

4. The arrangement of devices capable of supporting the platforms during their rise and fall, and of depositing the same automatically at the bottom of the trunk, substantially as described.

5. The arrangement of a conveyer, substantially as described, in combination with the platforms and the supporting-fingers, so as to remove said platforms from the bottom of the trunk.

CHARLES ALDEN.
A. D. DICKINSON,
*President.*

Witnesses:
W. HAUFF,
C. WAHLERS.